Jan. 16, 1962 T. J. SMITH 3,016,788
METHODS AND APPARATUS FOR COLOR GRADING
OF FRUITS AND VEGETABLES
Filed May 24, 1952 5 Sheets-Sheet 4

INVENTOR
TRAVER J. SMITH
BY Harper Green
ATTORNEY

3,016,788
METHODS AND APPARATUS FOR COLOR GRADING OF FRUITS AND VEGETABLES

Traver J. Smith, Santa Clara County, Calif., assignor, by mesne assignments, of one-half to Genevieve I. Magnuson and one-half to Genevieve I. Magnuson, Robert Magnuson, and Lois J. Fox, as trustees
Filed May 24, 1952, Ser. No. 289,717
16 Claims. (Cl. 88—14)

The present invention relates to the color grading of fruits and vegetables by using the characteristics of the spectral reflectance curve of a particular article in determining color as a measure of ripeness. More particularly the invention is concerned with the provision of methods and apparatus for color grading as outlined above, in which the color grading is made with reference to the cut or bisected surfaces of two pieces of the same fruit to obtain an average color determination which will correspond accurately to an average determination by a number of experienced visual graders. The invention is concerned also with eliminating variables which are apt to influence visual grading; for example, the surface gloss of the cut object, its size and shape, its internal cell structure, variations in color over the cut surface and comparison with other objects which may have immediately preceded the object being graded, or which are in view at the same time.

The invention is concerned with the production of a direct reading representative of the color classification which can be made readily by nontechnical personnel. The invention is concerned also with the provision of an instrument which is unaffected by weather or light conditions at the place of use, which is simple to calibrate and standardize and is not susceptible to inaccuracies due to varying voltage supply.

The above, among other objects of the invention, are attained as described in connection with a preferred embodiment of the invention, as illustrated in the accompanying drawings, in which.

The invention is described as embodied in an instrument for use in the classification of tomatoes and comprises an abridged spectrophotometer which measures the ratio of reflectance obtained at two selected points in the spectral reflectance curves of tomatoes. This general method of color classification is disclosed in Technologic Papers of the Bureau of Standards, No. 92, June 30, 1917, entitled "Measurement and Specification of the Physical Factors Which Determine the Saturation of Certain Tints of Yellow." These two points for tomatoes are selected as the 436 millimicron line of mercury in the blue portion of the reflectance curve and the dominant "line" of neon at 632, 640 and 651 millimicrons in the red portion of the curve. These neon lines are sufficiently close together to approximate a single line. The two selected lines in the blue and red portions of the spectral reflectance curve occur at well separated points in two plateau regions of the curve. These two lines are indicated at 10 and 11 in FIGURE 8 which shows typical reflectance curves of tomatoes of different color and maturity.

Preferably, the surfaces viewed are obtained by cutting or bisecting the fruit. For example, the two halves of a tomato, sliced transversely of its stem-blossom axis, are placed in a fixed selected position with their cut surfaces lying in the same plane in viewing position with respect to light sensitive means for producing electrical currents. The light sensitive means is subjected to diffuse reflected light from the tomato of a monochromatic nature at the selected line in the red portion of the spectral reflectance curve, i.e., approximately the 640 line of neon obtained from a neon arc lamp through a color filter. The resulting current is read on a meter, and the instrument is then adjusted so that this current reading is a standard arbitrary selected value. The light sensitive means is then subjected to diffuse reflected light of a monochromatic nature in the blue portion of its spectral reflectance curve, obtained by utilizing a mercury vapor arc and a color filter. The current resulting from this viewing of the tomato by the phototubes represents the ratio of the blue reflectance at the blue line to the red reflectance at the red line as a measure of color to provide an indication of ripeness and/or maturity.

Figure 1:
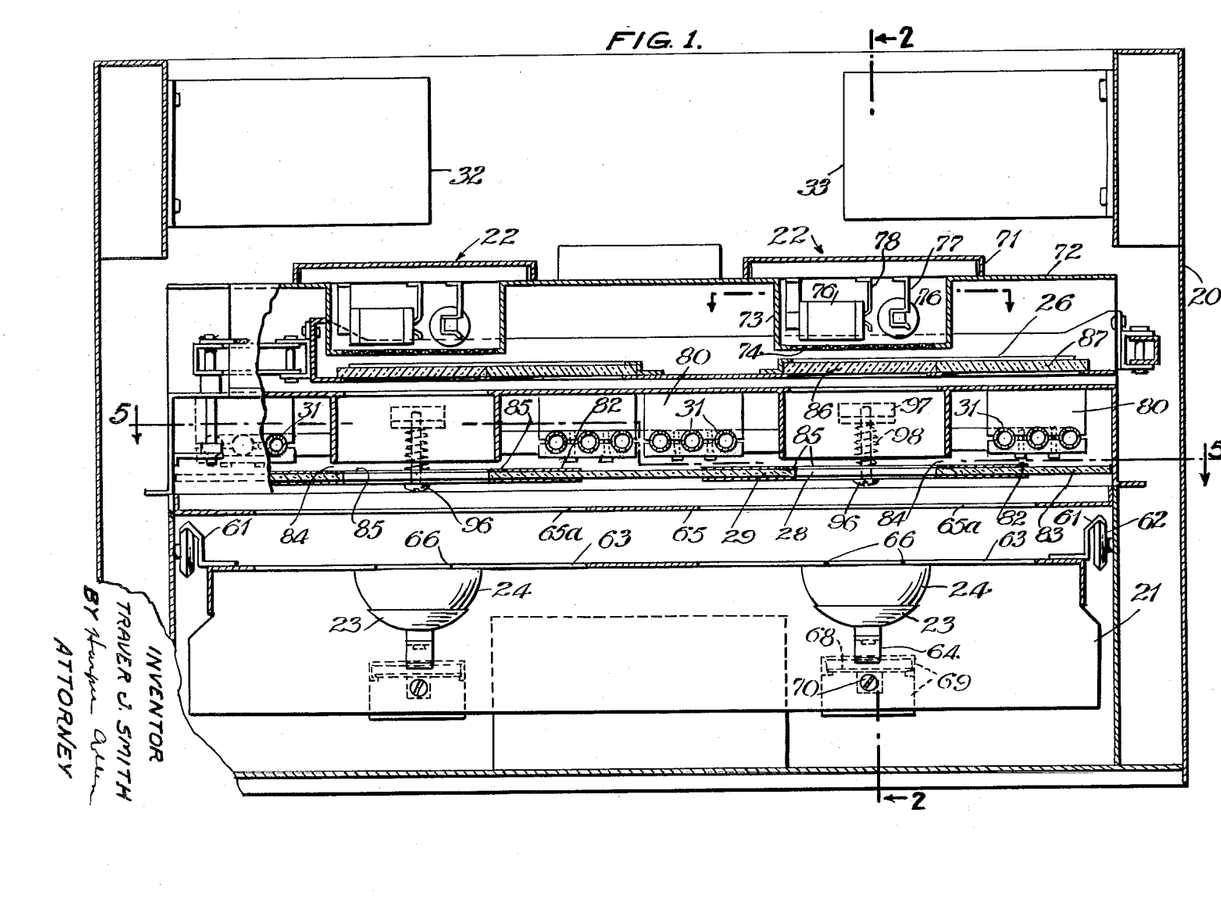
FIGURE 1 is a vertical sectional view of the instrument, partially in elevation and taken in a plane indicated by the line 1—1 in FIGURE 2.
Figures 2, 2A:
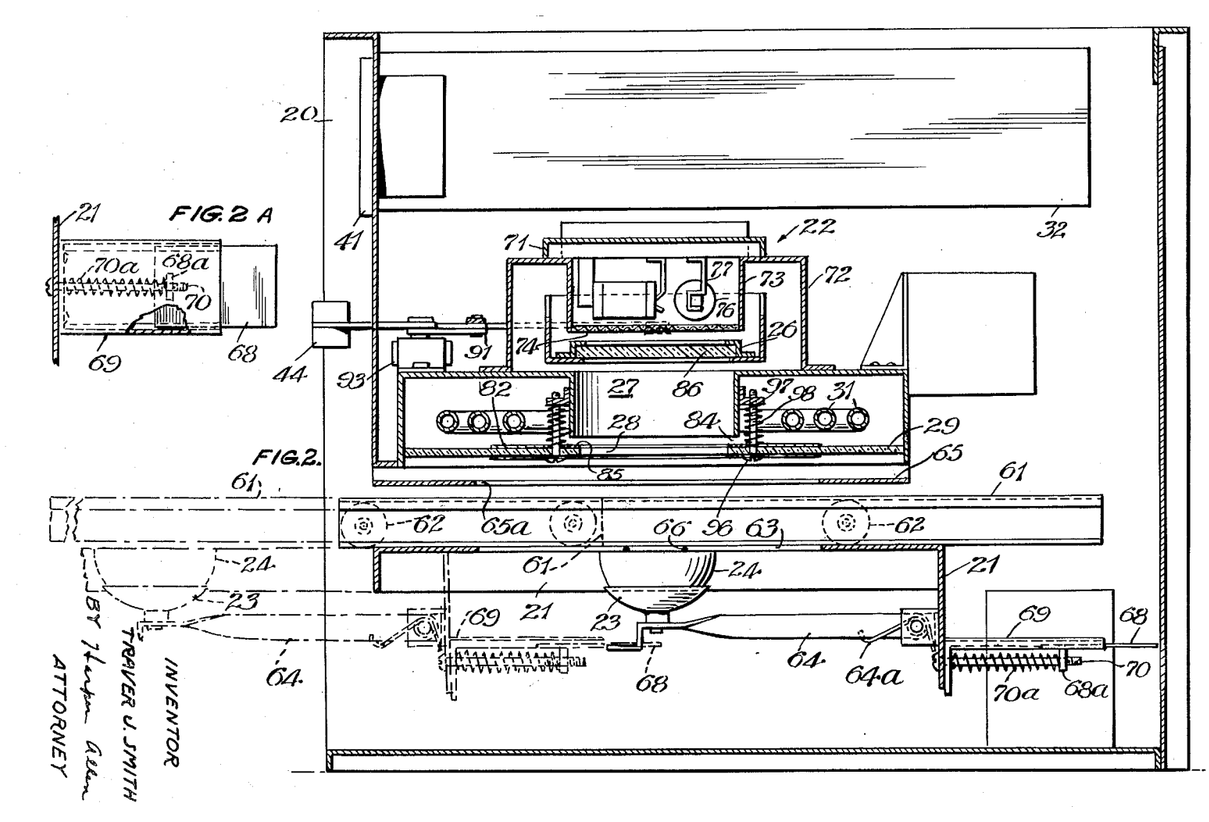
FIGURE 2 is a vertical sectional view, partially in elevation, taken in a plane indicated by the line 2—2 in FIGURE 1.
FIGURE 2A is a detail plan view.

Referring to FIGURES 1 and 2, the optical and mechanical features of the instrument will be described first. The instrument includes a suitable casing 20 providing a frame which supports a support or drawer 21 for holding the specimens to be graded. Two phototube units 22 positioned directly above two tomato support cups 23 in the drawer, and the phototube units are each adapted to view tomato halves 24 through a filter unit 26, a viewing cylinder 27 and an aligned aperture 28 of a light diffusing plate 29. The light diffusing plate 29 is constructed to transmit light from respective three-tube light sources 31 disposed in circular array about the respective viewing cylinders 27. Within the case or cabinet 20, there is also provided a shielded power unit 32 of conventional construction and a shielded amplifier unit 33 which is referred to in greater detail in connection with the description of the circuit.

Figure 3:
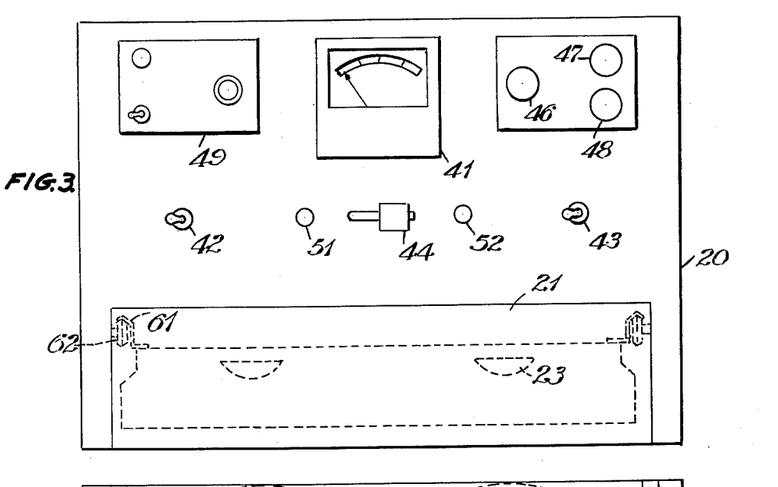
FIGURE 3 is a front elevational view of the instrument.

Referring to FIGURE 3, the panel of the instrument includes a meter 41, a meter switch 42, a high-low scale switch 43 for the meter, and certain circuit controls including a selector switch 44, a "standardize" potentiometer control 46, a "red zeroize" control 47 for a "red" potentiometer and a "blue zeroize" control 48 for a "blue" potentiometer, which are referred to in greater detail in connection with the circuit. Certain power supply controls are also shown on a panel 49. Also, a blue indicator light 51 and a red indictor light 52 are provided to indicate the setting of the circuit and the instrument. All of these various elements will be described in detail hereinafter.

Figure 6:
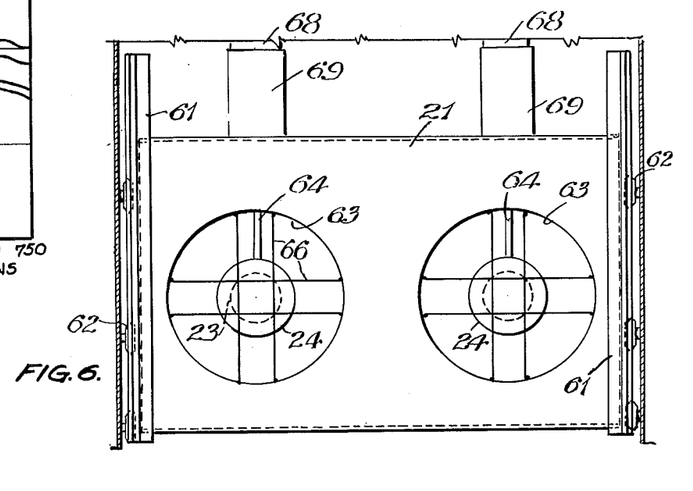
FIGURE 6 is a fragmentary plan view of the article holding drawer, being taken as indicated by the line 6—6 in FIGURE 1.

The specimen drawer 21 (FIGURES 1, 2 and 6) comprises an inverted sheet metal tray having opposite tracks 61 to ride on respective sets of rollers 62 on the frame. The top horizontal wall of the drawer is provided with respective similar apertures 63 concentric with the fruit supporting cups 23. These cups 23 are supported on the frame of the drawer by pivotally mounted arms 64, each urged by a spring 64a to the position shown. The two apertures 63 in the top of the drawer are each provided with respective sets of cross wires 66 arranged in pairs and extending at right angles to each other to form a grid to establish a plane of reference for engagement by the surface of a cut half of a tomato so that regardless of tomato size, the cut surface being viewed will always be located in the same plane. The wires 66 are arranged symmetrically with respect to the apertures 63 to provide a visual centering means for the fruit.

To provide proper optical viewing conditions and substantially eliminate spurious reflections, all of the metallic surfaces and wires within the drawer 21 and the case 20 are painted a dull black and the interior of the case is lined with a black velvet cloth or other similar material 67 having a minimum reflectance. Also, due to the fact that there is some reflectance from any metallic surface regardless of how painted or covered, a pair of color tongues or slide elements 68 of metal, plastic or other suitable material are carried by the drawer 21 so as to be out of viewing range when the drawer is in, and to be exposed to the phototubes when the drawer is out. The character of the reflecting surface of these tongues and their color is adjusted so that the same reflectance is obtained with these discs being viewed as with the various metallic surfaces on the drawer about a tomato half. Preferably, one of the tongues 68 is blue, and the other red and they are mounted for adjustment to vary their exposed surface in adjusting the instrument to zero with the drawer out. Each tongue 68 (FIGURES 2 and 2A) is slidably mounted in opposite guides 69a of an angle bracket 69 secured in rearwardly projecting position on the rear wall of drawer 21 and having a black upper surface. An adjusting screw 70 extends freely through the drawer wall and the bracket 69 and has threaded engagement with a depending ear 68a of tongue 68. A spring 70a is interposed between the ear 68a and the vertical position of the bracket 69 to maintain an expanded position of the tongue.

A light trap plate 65 is mounted in the frame 20 and is disposed immediately above the drawer 21. The plate 65 has respective apertures 65a in alignment with the apertures 63 of the drawer when it is closed.

Figure 7:
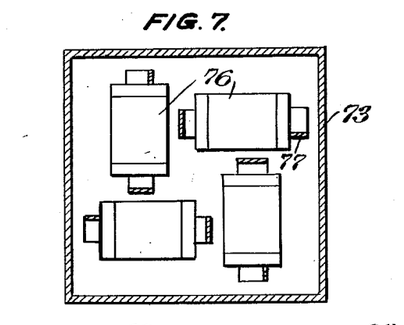
FIGURE 7 is a detail section on the line 7—7 in FIGURE 1.

The phototube units 22 are identical in construction so that only one will be described. The right-hand phototube unit 22 (FIGURES 1 and 2) is made up of a frame 71 removably seated in an aperture in a wall 72 of the frame and having a depending annular wall 73 whose open lower end supports a wire mesh screen 74 for electrical shielding. Within the phototube unit 22 there is supported four phototubes 76 supported by insulated contact brackets 77 and 78, respectively, from an insulating block 75 secured to the frame 71. These four phototubes are arranged in a symmetrical square array as a nest, with the end of one phototube positioned closely adjacent the side of an adjacent phototube and in turn having its side overlapping the end of the next adjacent phototube. (See FIGURES 1 and 7.) The phototubes 76 are selected to be of matched characteristics and an arrangement in the rectangular array compensates for the distortion due to the curved cathode surface by which an object is viewed by the phototube so as to reduce the effect of distortion in a signal from the entire nest of phototubes. With other numbers of phototubes a similar symmetrical array is formed placing the cathode surfaces at an angle to each other and as close as possible to the center point of the array.

The light source comprises means for subjecting the cut surfaces of the tomato halves simultaneously to a uniformly diffused, distributed, and mixed illumination from a blue light and a red light, and in the preferred embodiment shown, the light means comprises three arcuate gaseous discharge tubes 31 (FIGURES 1 and 2) disposed about the respective viewing cylinders 27, the two outer tubes 31 having mercury arc sources and the middle tube 31 having a standard neon tube source. These sets of tubes 31 are in circular array and are supported by suitable brackets 80 of transparent plastic secured on the frame. Light control means are provided for illuminating the cut halves of tomatoes wholly by reflected light from the tube sources 31, which reflected light will have a grazing incidence on the cut surface of the tomato so as to not transmit any specularly reflected light through the viewing cylinders 27 to the phototubes but to transmit substantially only diffuse reflected light. For this purpose the plate 29 (FIGURES 1 and 5) is provided, being formed of glass, plastic or some similar translucent material and having an opaque coating 82 on certain portions of its upper and lower surfaces, leaving respective translucent areas of annular shape 83 to transmit the light. Preferably the coating may be a blue paint to strengthen the blue source of light relative to the red and to provide a uniform mixture of red and blue light at the surface of the object being viewed. Also, each viewing cylinder 27 terminates short of the plate 29 to provide a gap 84 through which direct reflected light is transmitted to the phototubes to increase the red reflectance. A white annular ring 85 is provided on the upper surface of the diffusing plate 29 so that the phototubes are constantly subjected to a low level of illumination. Thus, a preload level of current is produced by the phototubes which insures that the amplifier will operate on a linear portion of its curve, and by adjustment of gap 84 different instruments can be given the same operating characteristics. The adjustment of gap 84 is effected at a plurality of points, four in the instant case, by similar adjustable connections, each comprising a screw 96 passing freely through the plate 29 and having threaded engagement with an angle bracket 97, a spring 98 being interposed between the bracket 97 and the plate 29. Adjustment of the screws 96 effects flexing of the plate 29 to adjust the gap 84.

Figures 4, 5:
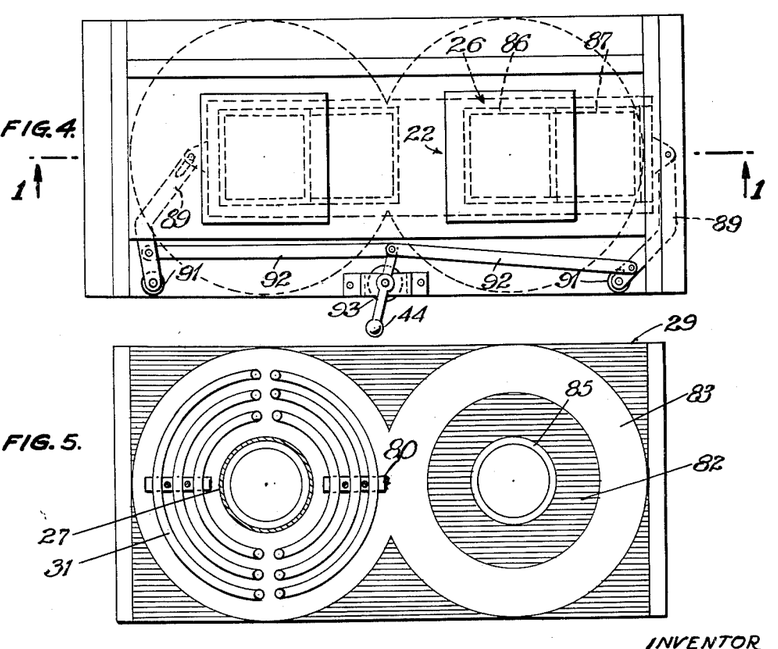
FIGURE 4 is a plan view with certain portions indicated in dotted lines.
FIGURE 5 is a horizontal sectional view taken in a plane indicated by the line 5—5 in FIGURE 1.

In order to secure substantially monochromatic illumination of the phototubes from the diffuse reflected light, means are provided in the form of a filter assembly 26 for selectively interposing a red filter 86 and a blue filter 87 in the space between each viewing cylinder and the phototubes as shown in FIG. 4. In the position shown in FIGURE 1, the red filters 86 are in active position. Filter 86 may be a Corning No. 2412, and filter 87 may be a Corning No. 5113. The filters 86 and 87 are carried on a filter slide 88 (FIGURES 1, 2 and 4) which is supported at its ends by links 89, each pivotally connected to an end of the filter slide and at its opposite end to a supporting pivot point 91 on the frame. The two links 89 are each connected by an intermediate link 92 pivoted to the operating lever 44, which is mounted on a rotary switch unit 93 of conventional construction so as to be moved therewith, thus by moving the lever 44 to its left hand position, as shown in FIGURE 4, the filter slide is moved to place the blue filters in the line of light transmission to the phototubes. At the right hand position of this lever the red filter is placed in the line of light transmission to the phototubes.

As will be explained in detail later, the movement of the lever 44 also operates certain switching elements in the circuit, so that certain elements individual to the "blue" reading are inserted at the same time that the blue filters are in place, and certain elements concerned with the "red" reading are in place at the same time as the red filter units.

Figure 9:
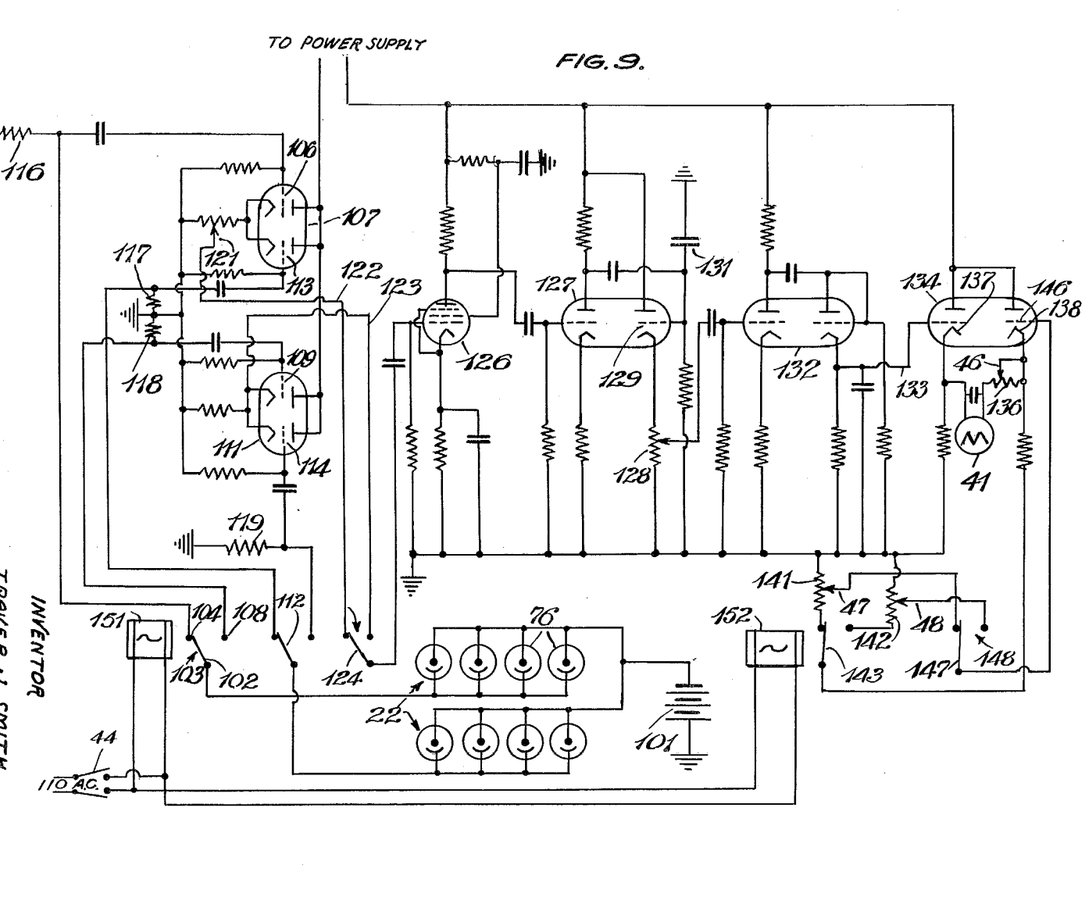
FIGURE 9 is a wiring diagram of the control circuit of the instrument.

Referring to FIGURE 9, an A.C. amplifier is shown which is conventional in all particulars not described in detail. The circuit generally includes the two nests 22 of phototubes 76 which have as the source of voltage a suitable battery 101. Phototubes of type 926 with S-3 spectral response may be used. One of these two nests 22 is connected to the movable contact arm 102 of a single-pole double-throw switch 103, one stationary terminal or contact 104 of which is connected to the grid 106 of a thermionic mixing tube 107, and the other stationary terminal 108 of the switch 103 is connected to the grid 109 of a similar tube 111. Similarly the other nest of phototubes is connected to the movable arm or center pole of a single-pole double-throw switch 112, one terminal of this switch being connected to the grid 113 of the tube 107 and the other terminal of which is connected to the grid 114 of the tube 111. As shown, the circuit is in its "red" position so that both nests of phototubes are connected to the two grids 106 and 113 of a mixing tube 107 of the cathode follower type, known commercially as a 6SC7. If the two movable arms of the double-throw switches are moved to the "blue" position, the two nests of phototubes feed their signals to the "blue" mixing tube 111 which is of the same type as the tube 107. The resistors 116, 117, 118 and 119, connected between ground and the respective leads to the grids 106, 109, 113 and 114, are selected in value to spectrally balance the dual input to the mixing tubes. Also, a potentiometer 121 is placed in the cathode circuit of tube 107, this tube being of the cathode follower type to provide an adjustment of ratio of output signals between the "red" and the "blue" tubes to compensate for a lower "blue" response and to provide a higher meter reading of the "blue" values. While this may be adjusted to a desired value for any particular product being color graded, in the case of tomatoes it has been found that a ratio of 1–5 in the output of these tubes is a satisfactory value.

The two output leads 122 and 123, respectively (FIGURE 9), from the respective cathodes of tubes 107 and 111 are connected to the respective terminals of a single-pole double-throw switch 124, the center movable arm 125 of which is connected to a conventional-type amplifier-type tube 126 of the 6SJ7 type having a conventional circuit arrangement of resistors and condensers for an A.C. amplifier. The output of the amplifier tube 126 is fed to the first half of a tube 127 of the type 6SN7, the first stage being an amplifier stage, and the second stage being used as a cathode follower. Associated with the cathode output of the tube 127 is a potentiometer 128 which serves as the "gain" control of the amplifier circuit.

To limit possible interference from outside sources of A.C. voltage, the second stage grid 129 of the tube 127 is connected to a condenser 131 of a suitable value to act as a low-pass filter so that frequencies above about 200 c.p.s. are eliminated.

The adjustable contact of the potentiometer 128 (FIGURE 9) is connected to the grid of a first-stage amplifier of a two-stage tube 132 of the 6SN7 type. The second stage of the tube 132 is connected as a detector and the cathode output therefrom is connected by a lead 133 to the grid of the first stage of a two-stage tube 134, which is also of the 6SN7 type. The tube 134 is used as a bridge in which a "standardize" potentiometer 136 is provided in the meter circuit between the two cathodes 137 and 138, and in which the cathode circuit of the cathode 138 may be made to include selectively either a "red" potentiometer 141 or a "blue" potentiometer 142. This selective connection of the potentiometers is provided by a single-pole double-throw switch 143 having its movable contact arm connected to the cathode 138, and its stationary contacts connected respectively to the potentiometers 141 and 142. The grid 146 of the second half of tube 134 is connected to the movable center arm 147 of a single-pole double-throw switch 148 whose stationary contacts are connected respectively to the adjustable contacts 47 and 48 of the potentiometers 141 and 142.

As explained later in connection with the description of operation, it will be seen that the potentiometers 136, 141 and 142 are used in the calibration of the circuit, so that by appropriate adjustments of the movable contacts 46, 47 and 48, with a reference standard viewed by the phototubes 76 to furnish the signal to the circuit, a zero reading will be obtained in either the "red" condition of the circuit or the "blue" condition of the circuit.

A suitable meter 41 is connected across the respective cathodes 137 and 138 of the bridge tube 134 to provide a reading of the output signal.

The respective movable contact arms of the respective switches 102, 112 and 124 form part of a standard relay including a solenoid 151, while the similar arms of the switches 143 and 148 are operated by a solenoid 152 of a second relay connected in parallel with the first relay. These relays are responsive to the "red" or "blue" condition of the switch 44 (FIGURES 3 and 9).

In operation in grading tomatoes the instrument is first calibrated as to ratio of response using a suitable standard such as a red or other colored disc of suitable plastic in the article support. With this disc in viewing position and using the ratio control for the potentiometer 121, the instrument is adjusted until the sensitivity of the blue reflectance reading is five times that of the sensitivity of the red reflectance reading. This establishes a suitable on-scale reading for the blue response.

After adjusting the instrument as above described, it is next adjusted for the red and blue "zeros" with the drawer in the closed position, with black plastic discs covering the article supporting cups, and with the instrument in its "blue" condition, i.e., with the blue filters in position and the blue circuit components active, the "blue zeroize" control 48 is adjusted so that the potentiometer 142 produces a zero reading of the meter 41. Then switching by means of the switching arm 44 to the red condition, the "red zeroize" control 47 is operated to change the potentiometer 141 until the meter 41 again reads zero. Then with the drawer out, so that the tongues 68 are being viewed, the instrument is again zeroized for both red and blue conditions by adjusting the red tongue for "red zeroize" and the blue tongue for "blue zeroize." The instrument is then ready for use.

Then the two halves of the same tomato are placed in the cups 23 with their cut surfaces against the grid of wires and visually centered with respect thereto. In this position of the cut surfaces of the tomato they are subjected to a grazing incidence of uniformly mixed, distributed and diffused light of 120 c.p.s. from the tubes 31. The red filters 86 being in position substantially only the 640 millimicron line will be transmitted to the phototubes from the reflected light. Utilizing the "standardize" control 46 the meter reading is set to 100, a selected arbitrary value. Thereafter the switch arm 44 is adjusted to place the instrument in its "blue" condition and the meter M is again read. This reading provides an indication of the color and/or maturity of the tomato.

After grading each tomato, the zero controls are again checked with the drawer out to confirm that the instrument maintained its stability during the grading procedure.

With respect to a tomato grading procedure specifically, the following formula provides a means for computing any particular grade reading for a tomato from its spectral reflectance curve. This formula is as follows:

$$G = KB \frac{S_B}{S_R} \frac{R_B}{R_R}$$

$$= (.83)(100)\left(\frac{5}{1}\right)$$

$$= 415 \frac{R_B}{RR}$$

where

Grade Reading $= G$
Constant $= K = .83$
Red Standardize $= B = 100$
Red Sensitivity $= S_R = 1$
Blue Sensitivity $= S_B = 5$
Red Reflectance $= R_R$ (at 640 mm. from curve)
Blue Reflectance $= R_B$ (at 436 mm. from curve)

Figure 8:
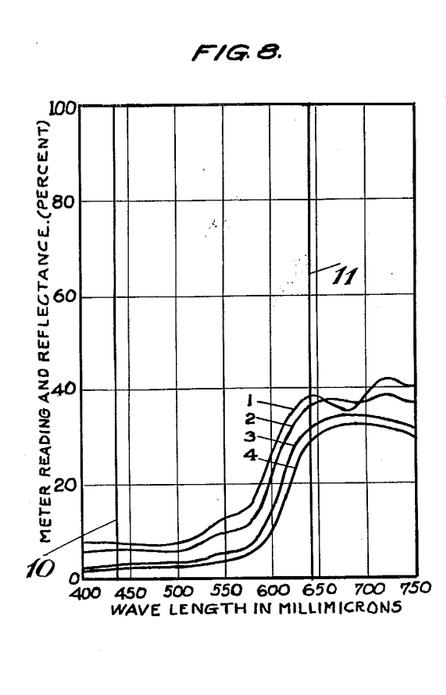
FIGURE 8 is a graph showing typical spectral reflectance curves for tomatoes.

Using the above formula with respect to the four specific spectral reflectance curves in FIGURE 8, the four grades are found to be 77, 65.5, 39.3, and 35.8. These correspond to the actual reading obtained by the grading instrument with the settings and constants as indicated.

By appropriate selection of the particular lines being used in a given reflectance curve for a given article, and providing suitable mechanical means to hold the article in viewing position, other fruit and vegetable articles can be classified as to color by the invention discussed herein.

While I have shown and described a preferred method and apparatus, it will be apparent that both the apparatus and method can be varied from the forms shown, so that the proper scope of the invention should be limited only by the scope of the claims appended hereto.

I claim:

1. In a color grading instrument, a casing, an article support in said casing for holding an article to be graded, phototube means mounted in said casing for viewing an article on said support, a source of light, light control means between said source of light and said article support for controlling illumination of said article and including means intercepting direct rays of light, and light filter means disposed in the path of light from said source to said phototube means for defining the character of light reflected from said article to said phototube means, said light source being of generally circular shape, and said light control means including a tubular well surrounded by said light source and defining a part of the viewing path from the article to the phototube means.

2. In a color grading instrument, a casing, an article support in said casing for holding an article to be graded, phototube means mounted in said casing for viewing an article on said support, a source of light, light control means between said source of light and said article support for controlling illumination of said article and including means intercepting direct rays of light, light filter means disposed in the path of light from said source to said phototube means for defining the character of light reflected from said article to said phototube means, said light source being of generally circular shape, and said light control means including a tubular wall surrounded by said light source and defining a part of the viewing path from the article to the phototube means, and a plate disposed at and spaced from the end of said tubular wall adjacent said support to provide an annular light transmitting passage from said light source to said phototube means, said plate having a light-transmitting aperture of smaller diameter than said tubular wall and in axial alignment therewith for transmitting light from said article to said phototube means.

3. In a color grading instrument, a casing, an article support in said casing for holding an article to be graded, phototube means mounted in said casing for viewing an article on said support, a source of light, light control means between said source of light and said article support for controlling illumination of said article and including means intercepting direct rays of light, and light filter means disposed in the path of light from said source to said phototube means for defining the character of light reflected from said article to said phototube means, said light source being of generally circular shape, and said light control means including a tubular wall surrounded by said light source and defining a part of the viewing path from the article to the phototube means, and a plate disposed at and spaced from the end of said tubular wall adjacent said support to provide an annular light transmitting passage from said light source to said phototube means, said plate also being apertured to define a part of said viewing path, and means for adjustably varying the spacing of said plate with respect to said tubular wall to control the amount of light transmitted by said passage.

4. In a color grading instrument, a casing, an article support in said casing for holding an article to be graded, phototube means mounted in said casing for viewing an article on said support, a source of light, light control means between said source of light and said article support for controlling illumination of said article and including means for intercepting direct rays of light, light filter means disposed in the path of light from said source to said phototube means for defining the character of light reflected from said article to said phototube means, said filter means including respective filters for transmitting substantially monochromatic light lines in a blue portion of the spectrum and in a red portion of the spectrum, and said source of light including a red light source and a blue light source.

5. In a color grading instrument, a casing, an article support in said casing for holding an article to be graded, phototube means mounted in said casing for viewing an article on said support, a source of light, light control means between said source of light and said article support for controlling illumination of said article and including means for intercepting direct rays of light, light filter means disposed in the path of light from said source to said phototube means for defining the character of light reflected from said article to said phototube means, said filter means including respective filters for transmitting substantially monochromatic light lines in a blue portion of the spectrum and in a red portion of the spectrum, and said source of light including a mercury arc source and a neon arc source.

6. In a color grading instrument, a casing, an article support in said casing for holding an article to be graded, phototube means mounted in said casing for viewing an article on said support, a source of light, light control means between said source of light and said article support for controlling illumination of said article and including means for intercepting direct rays of light, and light filter means disposed in the path of light from said source to said phototube means for defining the character of light reflected from said article to said phototube means, said filter means including respective filters for transmitting substantially monochromatic light lines in different portions of the spectrum, and said source of light including respective light sources in said respective portions.

7. In a color grading instrument, a casing, an article support in said casing for holding an article to be graded, phototube means mounted in said casing for viewing an article on said support, a source of light, light control means between said source of light and said article support for controlling illumination of said article and including means for intercepting direct rays of light, light filter means disposed in the path of light from said source to said phototube means for defining the character of light reflected from said article to said phototube means, said filter means includes respective filters for transmitting substantially monochromatic light lines in different portions of the spectrum, and said source of light includes respective light sources in said respective portions, and means for controlling said filter means to condition selectively either of said filters for operation.

8. In a color grading instrument as recited in claim 7, which includes an amplifier circuit responsive to said phototube means and providing an indication of current passing therethrough, said circuit including elements individual to signals produced by said respective light lines, switching means for selectively placing the respective elements in active condition in the circuit, and a common control for said switching means and for said filter controlling means.

9. In a color grading instrument as recited in claim 7 which includes an amplifier circuit responsive to said phototube means and providing an indication of current passing therethrough, said circuit including elements individual to signals produced by said respective light lines, switching means for selectively placing the respective elements in active condition in the circuit, and a common control for said switching means and for said filter controlling means, said circuit also including means for adjusting the ratio of response of said circuit to said respective lines of light.

10. In a color grading instrument as recited in claim 7 which includes an amplifier circuit responsive to said phototube means and providing an indication of current passing therethrough, said circuit including elements individual to signals produced by said respective light lines, switching means for selectively placing the respective elements in active condition in the circuit, and a common control for said switching means and for said filter unit controlling means, said circuit also including a bridge element having respective legs corresponding to the respective lines of light and under the control of said switching means for selectively placing said legs in active condition in the circuit.

11. In a color grading instrument as recited in claim 7, which includes an amplifier circuit responsive to said phototube means and providing an indication of current passing therethrough, said circuit including elements individual to signals produced by said respective light lines, switching means for selectively placing the respective elements in active condition in the circuit, and a common control for said switching means and for said filter unit controlling means; said circuit elements including respective mixing tubes, each tube having a pair of grids, and said switching means including means for connecting the respective phototube units to the respective grids of one mixing tube when one line of light is being transmitted and to the respective grids of the other mixing tube when the other line of light is being transmitted.

12. In a color grading instrument as recited in claim 7, which includes an amplifier circuit responsive to said phototube means and providing an indication of current passing therethrough, said circuit including elements individual to signals produced by said respective light lines, switching means for selectively placing the respective elements in active condition in the circuit, and a common control for said switching means and for said filter unit controlling means; said circuit elements including respective mixing tubes, each tube having a pair of grids, and said switching means including means for connecting the respective phototube units to the respective grids of one mixing tube when one line of light is being transmitted and to the respective grids of the other mixing tube when the other line of light is being transmitted, the cathode output of at least one of said mixing tubes including a potentiometer.

13. In a color grading instrument, a casing, an article support, mounting means for said support movably carried by said casing for movement into and out of the casing, said article support including means for holding articles to be graded, phototube means mounted in said casing for viewing an article in said support with said support positioned in said casing, a source of light, light control means between said source of light and said article support for controlling illumination of the article, and filter means disposed in the path of light from said source to said phototube means for defining the character of light reflected from said article to said phototube means, said support including a grid of wires disposed in a plane forming a plane of reference adjacent said support for engagement by an article to be graded.

14. In a color grading instrument, a casing, an article support, mounting means for said support movably carried by said casing for movement into and out of the casing, said article support including means for holding articles to be graded, phototube means mounted in said casing for viewing an article in said support with said support positioned in said casing, a source of light, light control means between said source of light and said article support for controlling illumination of the article, and filter means disposed in the path of light from said source to said phototube means for defining the character of light reflected from said article to said phototube means, said support including a grid of wires disposed in a plane forming a plane of reference for an engagement by an article to be graded, said grid of wires being symmetrical about a common center and providing visual centering means for the article.

15. In a color grading instrument, a casing, an article support, mounting means for said support movably carried by said casing for movment into and out of the casing, said article support including means for holding articles to be graded, phototube means mounted in said casing for viewing an article in said support with said support positioned in said casing, a source of light, light control means between said source of light and said article support for controlling illumination of the article, and filter means disposed in the path of light from said source to said phototube means for defining the character of light reflected from said article to said phototube means, said support including a set of wires disposed in a plane forming a plane of reference adjacent said support for engagement by an article to be graded, and means for yieldably urging said support toward said wires.

16. In a color grading instrument, a casing, an article support, mounting means for said support movably carried by said casing for movement into and out of the casing, said article support including means for holding articles to be graded, phototube means mounted in said casing for viewing an article in said support with said support positioned in said casing, a source of light, light control means between said source of light and said article support for controlling illumination of the article, filter means disposed in the path of light from said source to said phototube means for defining the character of light reflected from said article to said phototube means, and color means mounted in said case to be viewed by the phototube means when said support is in its outward position and to be concealed when said support is in its inward position, said color means being calibrated to provide the same reflectance when viewed by the phototube means as the reflectance of the said support when viewed by said phototube means when in its inward position.

References Cited in the file of this patent

UNITED STATES PATENTS

| | | |
|---|---|---|
| 563,804 | Ritter | July 14, 1896 |
| 796,961 | Dunn | Aug. 8, 1905 |
| 1,943,278 | Thompson et al. | Jan. 9, 1934 |
| 2,020,281 | Stone et al. | Nov. 5, 1935 |
| 2,131,095 | Cox | Sept. 27, 1938 |
| 2,162,529 | Dawson et al. | June 13, 1939 |
| 2,244,826 | Cox | June 10, 1941 |
| 2,273,356 | Holven et al. | Feb. 17, 1942 |
| 2,292,230 | Lemon | Aug. 4, 1942 |
| 2,319,663 | Crowley | May 18, 1943 |
| 2,358,325 | Flyer | Sept. 19, 1944 |
| 2,424,858 | Senn | July 29, 1947 |
| 2,447,985 | Mass | Aug. 24, 1948 |
| 2,580,275 | Bickley | Dec. 25, 1951 |
| 2,625,265 | Cox | Jan. 13, 1953 |
| 2,653,508 | Whiteley | Sept. 29, 1953 |
| 2,696,297 | Matthews | Dec. 7, 1954 |
| 2,774,276 | Glasser et al. | Dec. 18, 1956 |

FOREIGN PATENTS

| | | |
|---|---|---|
| 623,963 | France | Mar. 28, 1927 |